Sept. 2, 1969          D. SILVERMAN          3,464,490
FORMATION NUCLEAR FRACTURING PROCESS
Filed Aug. 30, 1965                    2 Sheets-Sheet 1
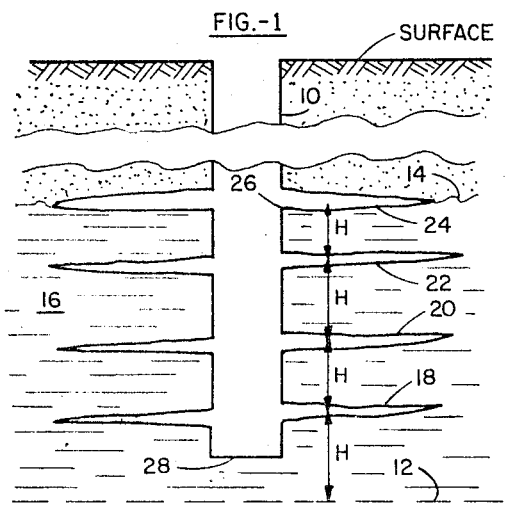
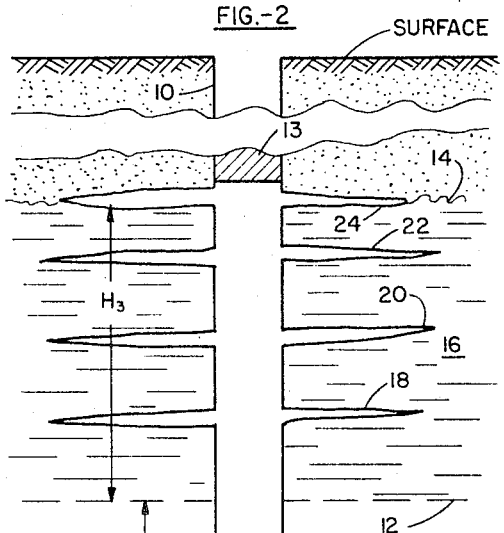
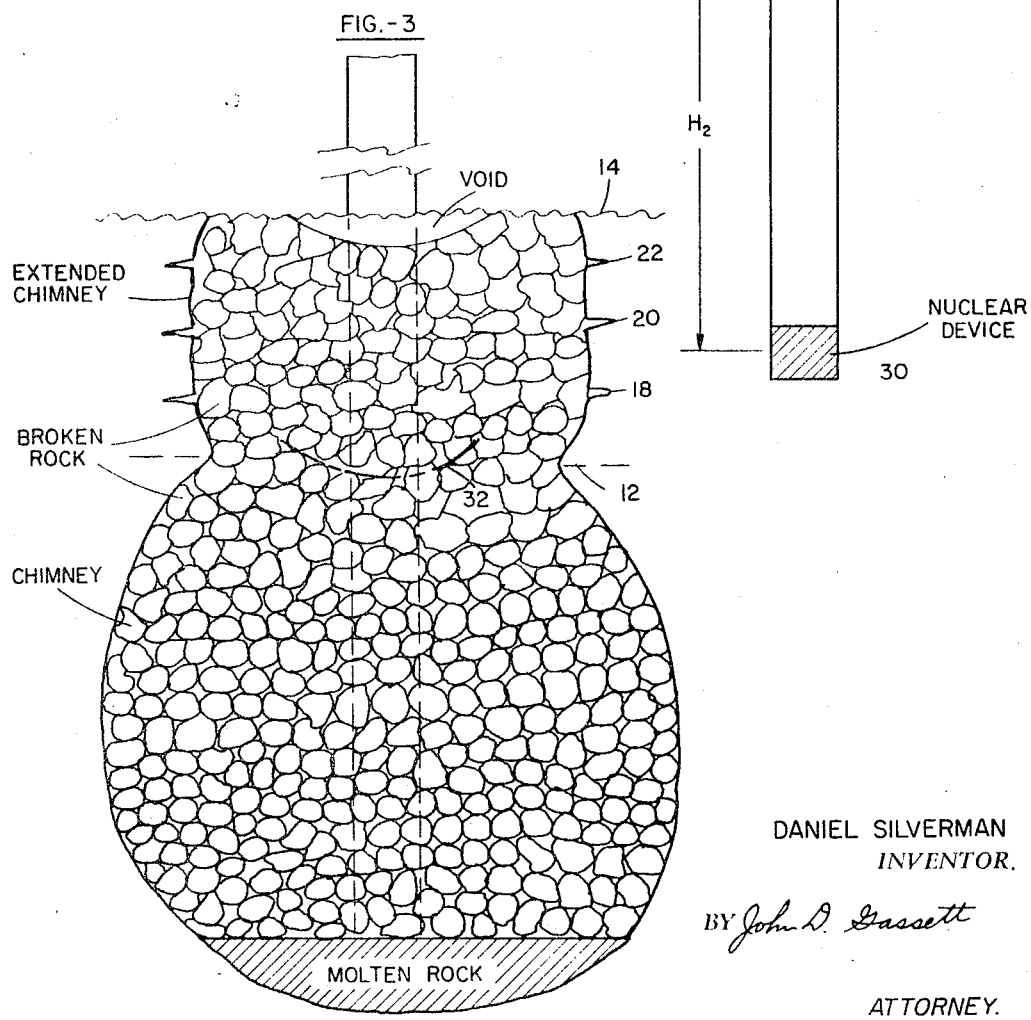
DANIEL SILVERMAN
INVENTOR.
BY John D. Gassett
ATTORNEY.

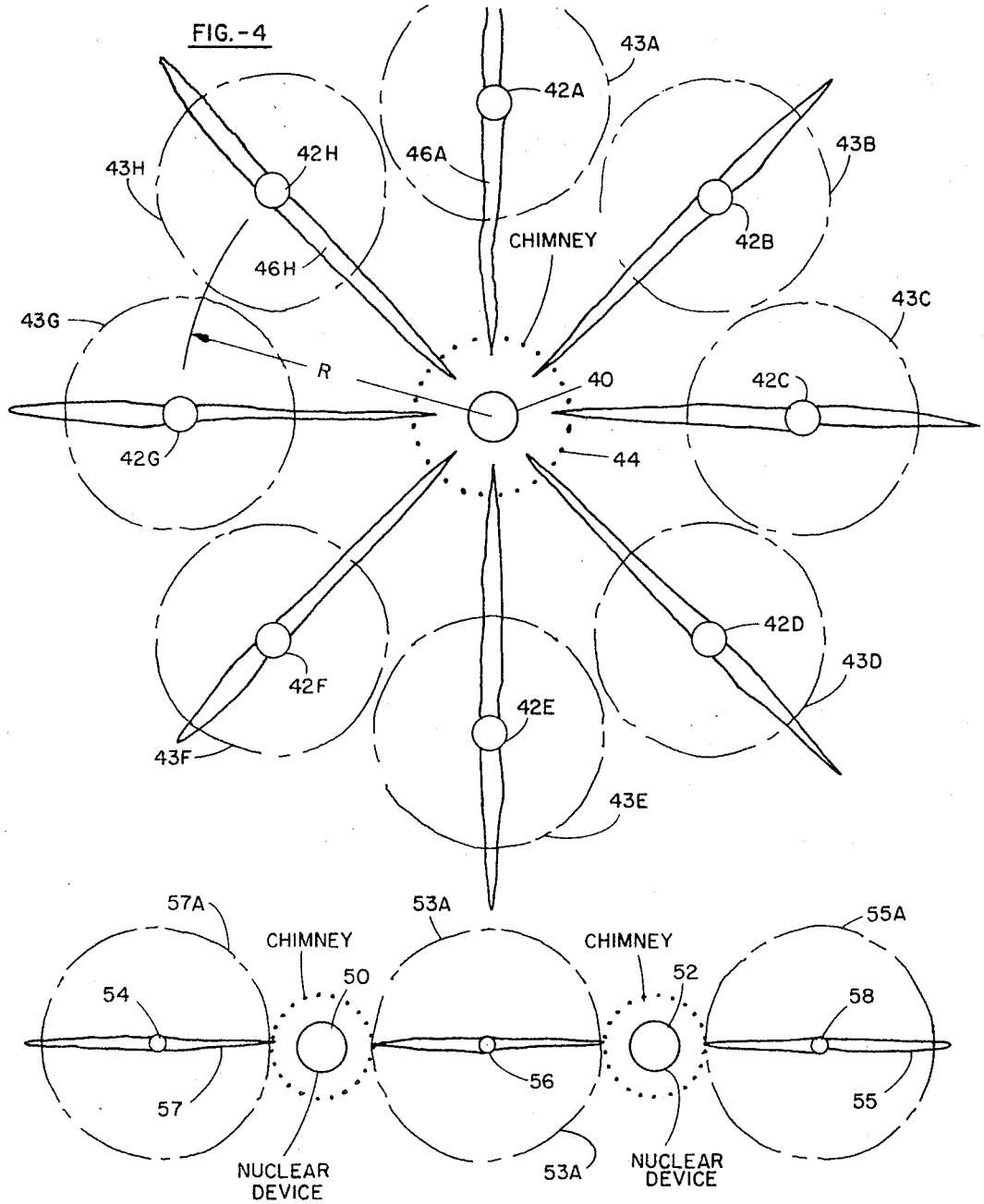

United States Patent Office 3,464,490
Patented Sept. 2, 1969

3,464,490
FORMATION NUCLEAR FRACTURING PROCESS
Daniel Silverman, Tulsa, Okla., assignor to Pan American Petroleum Corporation, Tulsa, Okla., a corporation of Delaware
Filed Aug. 30, 1965, Ser. No. 483,749
Int. Cl. E21b 43/26
U.S. Cl. 166—245                 12 Claims

ABSTRACT OF THE DISCLOSURE

A method of treating an underground formation to increase the yield of petroleum therefrom. A placement well is drilled to the formation to be treated. The location and size of the chimney wanted in the deposit is selected. A nuclear device is then selected so that its conventionally formed chimney will not ordinarily extend vertically as far as that desired. Before the nuclear device is detonated, the formation just above the anticipated chimney is preconditioned so that the chimney will be extended vertically beyond that which could otherwise be expected. A preferred form of preconditioning includes placing a series of horizontal fractures just above the top of where it is anticipated that the chimney will be formed. When the chimney is formed, support for the fractured rock is removed, thus causing the fractured rock above the nuclear formed chimney to fail. This increases the height of the chimney to the upper of the spaced horizontal fractures. Other embodiments of preconditioning a well to extend the effect of the detonation of the nuclear device are disclosed.

---

This invention relates to the underground detonation of nuclear devices. It relates especially to the use of such underground nuclear explosions in the recovery of minerals and in the recovery of petroleum in particular.

When a nuclear device is detonated underground in a confined chamber, a cavity is formed in the formation in a very short period of time. It has further been found that when the cavity is first formed that its walls are lined with melted rock. Most of the melted rock tends to run or drip to the bottom of the cavity. Shortly after the cavity is formed, the roof collapses and broken rock falls into the cavity. The roof collapse continues progressively upward until the top of the resultant column of broken rock supports the overhead. At this point, nearly all of the originally formed cavity is filled with broken rock which extends upwardly. The volume or space in which the broken rock has accumulated is called the "chimney." The diameter of the chimney is approximately the same as that of the cavity and the height may be about 2 or more times the cavity diameter when measured from a shot point to the top of the chimney. The height of the chimney can be predicted.

The Atomic Energy Commission has conducted several tests underground on nuclear explosions in Nevada. One such test is commonly referred to as the Rainier test, conducted in September 1957. A considerable amount of very useful information has been obtained as a result of such test. For example much has been learned of the formation of underground cavities and "chimneys" and the relationship of the geometric shape of such chimney to the energy content of the nuclear device and the nature of the rock in which the chimney is formed. It has been found that such chimneys are formed when a nuclear explosion is made in rock which is buried so deeply that it will not cause a crater on the surface of the earth. Further during the first few microseconds after detonation, the explosion creates a spherical cavity filled with very hot radioactive gas at extreme pressures. This first pressure is very great and is believed to be as much as hundreds of thousands or even millions of atmospheres. The hot gas comes from vaporization of both the explosive itself and water and rock in the immediate vicinity of the explosion. This tremendous pressure forces the cavity to expand until in a very short period, such as a few tenths of a second, it may be as much as 100 feet or more in diameter. The cavity diameter depends largely upon the energy yield of the explosion, the depth at which the nuclear device is detonated, the average depth of the overlying formations and the water content of the host rock. For a further discussion of the size of the cavity, attention is directed to C. R. Boardman, D. D. Rabb and R. D. McArthur, "Characteristic Effects of Contained Nuclear Explosions for Evaluation of Mining Applications;" Lawrence Radiation Laboratory (Livermore) Report UCRL–7350, Rev. I (1963). Thus the size of the cavity can be predicted in advance with a fair degree of accuracy by taking into account the proper factors. It is further seen that by controlling the energy yield of the explosion that within limits the size of the cavity can be controlled.

When a nuclear device is detonated underground, in addition to the high pressure gas discussed above, very severe shock waves are also created. Such shock waves travel in all directions from the point of placement of the nuclear device and would normally be expected to reach the surface of the earth in a fraction of a second. Directly above the explosion, depending upon the depth and the strength of the nuclear device, the effects of the shock waves are normally quite apparent as a vibrant shaking of the surface of the earth causing soil, loose rocks, etc. to be disturbed. In fact these visible effects can give the appearance of a break-through, but in the case of the Rainier shot for example they are merely caused by the shock waves and there was no break-through beyond the chimney.

It has been suggested that underground nuclear devices be detonated in or near underground deposits of petroleum to increase recovery.

Many underground formations fail to give up the petroleum due to various reasons such as low permeability in which the petroleum cannot pass through the pore spaces in the reservoir rock and in some cases the petroleum or oil itself is too viscous to flow. In some deposits of petroleum, the oil appears in a form known as oil shale. Although not yet competitive with other forms of obtaining petroleum, oil shale can be mined and processed so as to recover the oil. One such method includes the breaking of the shale into small pieces, mining the broken shale and recovering the shale by retorting at the surface.

It has been suggested that oil be recovered from oil shale by in situ retorting. In one suggested method a nuclear device is used. Then when the underground nuclear device is detonated, a chimney of broken oil shale is formed in the formation. In such cases fire is started at the top of the chimney and gas and petroleum collected at the bottom.

An important feature in using underground nuclear explosions in oil shale or in secondary recovery projects is the breaking down of the formation so as to increase its permeability. One might think then that the solution might be to use larger and larger nuclear devices so that more and more of the formation would be broken or fractured. However, this is not the case for several reasons. (1) The cost of the larger nuclear devices might make such procedure prohibitive. (2) A nuclear explosion might not be adequately contained. It is thus seen that it is desired to use as small a nuclear device as possible both to aid in the economics of such recovery and to make it possible to use the energy created in the most efficient manner. The present invention is designed to increase the extent and control of the desirable fracturing influences of a nuclear explosion.

In accordance with one preferred embodiment of the present invention, a placement well is drilled to the formation, such as a shale deposit, which is to be treated. The location and size of the chimney which is wanted in the deposit is selected. A nuclear device is then selected so that the conventionally formed chimney will not extend vertically as far as the one selected. As can be seen, this permits the use of a more economical nuclear device by the use of my invention. In accordance with my invention before the nuclear explosion is detonated, the formation above this projected or anticipated chimney is pre-conditioned so that the chimney will in effect be extended to any height desired. A preferred form of pre-conditioning includes the formation of a series of spaced horizontal fractures in which the lower of such fractures is spaced at approximately the same depth as that of the top of the chimney if formed conventionally, i.e., without my pre-conditioning. Then, when the nuclear device is detonated, the traveling shock waves vertically fracture the already weakened pre-conditioned overburden so that the chimney, that is the broken rubble, is extended upwardly to the top horizontal fracture. As will be seen, pre-conditioning horizontal or vertical fractures can also be used to expand the chimney or fractured segments in a horizontal direction if desired.

Various objects and a better understanding of the invention can be had from the following description taken in conjunction with the drawings in which:

FIGURE 1 illustrates horizontal fracturing as a part of the pre-conditioning process before the placement of a nuclear device;

FIGURE 2 illustrates a placement well for receiving the nuclear device or bomb below the horizontal fractures;

FIGURE 3 illustrates the chimney and its extension into the fractured area;

FIGURE 4 illustrates one means of extending horizontally the fractures caused by the nuclear explosion; and FIGURE 5 illustrates a system of extending a highly broken area of formation along a line such as along a formation having a limited width.

Attention is first directed toward FIGURE 1 which illustrates the pre-conditioning of the placement well before the nuclear device is detonated. Shown thereon is a wellbore 10 which has been drilled to approximate depth of a horizontal plane 12 which in the absence of this invention would be the approximate top of the conventional chimney. Also shown in FIGURE 1 is an interface or horizontal plane 14 which is the desired top of the extended chimney. Horizontal plane 14, for example, might be the top of an underground shale oil section. That part of the formation 16 which lies between horizontal plane 12 and interface 14 is pre-conditioned to permit extension of the chimney. In the case illustrated in FIGURE 1, the pre-conditioning is effected by the formation of horizontal fractures 18, 20, 22 and 24. It is not necessary that these fractures be completely horizontal; however, it is believed that the more nearly horizontal that these fractures are, the more definite will the control of the extended chimney be. The fractures shown radiate in all directions from borehole 10 and thus take the shape of discs.

When drilling placement hole 10, cores or other samples of the formation 16 between depth 26 at the top of the formation and depth 28 at the bottom of the borehole may be taken. These samples are useful in determining the strength of the rock encountered and are useful in determining the distance H which is the vertical distance between fractures. The determination of the horizontal span which a given thickness of a particular rock can support is a well developed art. In general, and relating to this invention, it can be said that the greater the diameter or span of the disc of the horizontal fracture, the thicker H can be since it is the unsupported span that will fall. Many articles have been written on hydraulic fracturing and on ways and means of controlling and determining the direction and extent of such fractures. It is preferred that the fractures be filled with a propping agent in a method such as described in Reissue Patent 23,733 issued on Nov. 10, 1953, in the name of Riley F. Farris. The propping agents will maintain the fractures in an open condition and permit the rapidly expanding gas generated by the nuclear explosion to enter therein. This aids in obtaining the failure of the unsupported areas between the fractures. However, it may not always be necessary to prop the fracture since the desired action is to weaken the attachment of a layer of rock to the rock above it, so that when it becomes unsupported from below (that is, when the cavity is formed) it will drop of its own weight. However, it can be stated that while the propping material may not always provide a great improvement it will undoubtedly provide some improvement in the separation and break up of each horizontal slab.

FIGURE 2 illustrates the condition after the fractures have been formed and the placement well has been deepened to the desired depth. The nuclear device 30 is placed a distance $H_2$ below the horizontal plane 12. In this case $H_2$ is the height of the chimney which the particular nuclear device position would normally create. $H_3$ is the distance above horizontal plane 12 which it is desired to extend such chimney. Fractures 18, 20, 22 and 24 of FIGURE 2 are the fractures discussed above in FIGURE 1. At some point above fracture 24, placement well 10 is plugged as at point 13. Suitable means of plugging the shaft is by the setting of a cement plug and pouring a high density cement in the borehole and permitting the cement to set.

After the placement well 10 has been pre-conditioned by the formation of the fractures the nuclear device is inserted, the well plugged and the device 30 is detonated. As stated above during the first few microseconds after detonation the explosion creates a spherical cavity with very hot gas at excessively high presures. This expanding gas causes a cavity which, in a given reservoir, has a size which is a function of the energy contained in the nuclear device. When the pressure of the gas in the cavity has decreased sufficiently such as by expanding the size of the cavity or expanding into the horizontal fractures, the roof of the cavity will no longer support the overhead rock which begins to collapse and crumble into the cavity thus quickly forming the chimney discussed above. As will be recalled, the top of the conventional chimney is a void space (as indicated by dashed line 32) insofar as reservoir rock is concerned. By pre-conditioning the formation above the extent of the conventional chimney, that part of the formation 16 above such void 32 will also collapse as height H is selected so that such portion is not self-supporting. This collapse will extend progressively upward between fractures until fracture 24 is reached. Thus the chimney is extended from horizontal plane 12 to interface 14 as illustrated in FIGURE 3. The void space is now adjacent interface 14 instead of at horizontal plane 12 as indicated by dashed lines 32. The broken vertical lines indicate the outline of the location of placement well 10 prior to detonation of the nuclear device. The interior of the conventional chimney and extended chimney is filled with broken rock. The permeability in this broken rock is very high and can be as high as 5 to 10,000 darcies or higher. The entire expanded chimney can then be used as desired. For example, if it is formed in a shale oil formation it can be used as an enlarged retort over that previously suggested for a conventional chimney.

I have discussed above, a way of extending the vertical effect of the nuclear device. However, there are some formations in the United States which are relatively thin, say less than 50 to 75 feet, and most conventionally formed chimneys would extend through and beyond the top and bottom of the formation. In such a formation one would ordinarily wish to conserve energy by extending the fracturing effect horizontally instead of vertically. Accordingly FIGURE 4 illustrates a system whereby the effect of the nuclear blast is extended horizontally rather than vertically, although both actions can be provided simultaneously. Shown in FIGURE 4 is a horizontal pattern illustrating nuclear device 40 surrounded by a plurality of support wells 42A, 42B, 42C, 42D, 42E, 42F, 42G and 42n. Also shown thereon is dotted line 44 which is the diameter of the spherical cavity which would be formed by conventional detonation of a nuclear device. The wells 42A through 42n are preferably arranged in a circle or other symmetrical pattern having radius R about the nuclear device 40. These wells can be of small diameter and thus are smaller than the placement well drilled for nuclear device 40. This greatly keeps the cost of such support wells down.

The formation surrounding the nuclear device within the radius R is pre-conditioned to aid in the horizontal propagation of effects of the nuclear explosion. This preconditioning is accomplished by fracturing the formation in a vertical plane between the peripheral wells and the nuclear device. This is normally done after the placement well has been drilled but before the nuclear device is set in position. There have been several articles written on methods of vertically fracturing wells, for example, U.S. Patent 2,952,319. Again it is not essential that the fractures be completely vertical, however the more nearly vertical they are the more efficient the operation. This fracture pattern can be seen in FIGURE 4. The vertical fractures extend nearly to the placement well or at least into the sphere which will eventually be the geometrical location of the spherical cavity. After each well has been vertically fractured as indicated in FIGURE 4 the nuclear device is placed in placement well 40. Then both the support wells and the placement wells are plugged as indicated for the placement well in FIGURE 2. The nuclear device is then detonated. The formation adjacent each fracture 46A to 46H is subjected to both a very high pressure because the fracture extends into the spherical cavity and to severe shock waves from the nuclear explosion. This tends to break down or crumble the formation along the fractures from the point of explosion to the support wells. The amount of fracturing of the formation between the radial fractures for a given formation is dependent primarily upon the energy of the nuclear device and the distance between the vertical fractures. It is thus seen that in the arrangement of FIGURE 4 the fracturing effects of the nuclear device are greatly extended horizontally.

The fracturing effect within the perimeter of the support wells 42A to 42H of FIGURE 4 can be further aided by horizontal fractures in one or more levels in each support well. This permits carrying the fracturing effect of the high gas pressures and shock wave of the detonation into the spaces between the support wells 42A to 42H, and into the area outside of this perimeter. This is shown by the dashed circles 43A to 43H, one of which surrounds each of the support wells.

FIGURE 5 illustrates a system for extending highly fractured or pulverized areas of a formation in a linear direction. This is particularly suitable for narrow strips of hydrocarbon deposits which are to be mined or processed. In this case, two placement wells 50 and 52 are drilled and support wells 54, 56 and 58 are drilled along a line between and on either side of the placement wells. Here the support wells are vertically fractured in the plane toward the placement wells similarly as described in FIGURE 4 to obtain fractures 53, 55, and 57. The placement and support wells are then plugged and the nuclear devices detonated. The formation between the placement and support wells is then subjected to severe fracturing and shattering along the vertical fractures. This greatly increases the horizontal extent of the nuclear explosion.

It is possible to separate the nuclear placement wells 50 and 51 so as to place more than one support well 56 in between, dependent upon the range of fracturing possible by the use of support wells. Alternatively a single placement well can be used and one or more support wells placed on each side of it. Also, as discussed in connection with FIGURE 4, a combination of vertical and horizontal fractures created out of the support wells is possible. This is indicated by the dashed circles 53A, 55A and 57A surrounding the support wells. These horizontal fractures can be made at one or more elevations.

As another alternative, in the embodiment of FIGURES 1, 2 and 3, a large number of horizontal fractures is made in the placement well through the same vertical interval at which the vertical cavity of the nuclear device is formed. The horizontal fractures are generated so that they extend horizontally beyond the expected diameter of the conventional chimney. Vertical fractures, alone or with the horizontal fracture, can also be used. This is one way of expanding the horizontal effect of the nuclear explosion without the drilling of support wells.

While there are disclosed above a limited number of specific embodiments of this invention, various modifications can be made thereto without departing from the inventive concept. Therefore it is desired that the invention be measured only by the following claims.

I claim:
1. A method of increasing the size of a chimney formed by the detonation of a selected underground nuclear device which comprises:
 (a) establishing an underground placement cavity for said nuclear device including a borehole drilled from the surface to the position of said placement cavity;
 (b) creating a plurality of spaced horizontal fractures in the formation surrounding said borehole, said horizontal fractures being formed in the vertical space between the position of said device and the desired top of a chimney to be formed by detonating said selected nuclear device, at least one horizontal fracture being within the vertical space between the top of the chimney expected in the absence of fracturing and the desired top of the chimney; and
 (c) thereafter placing a nuclear device in said placement cavity, plugging said borehole and detonating said device after step (b).

2. A method as defined in claim 1 which includes spacing said horizontal fractures throughout the vertical distance between the position of said nuclear device and the desired top of the chimney, the diameter of said chimney being greater than the expected diameter of the cavity formed by said detonation.

3. A method of increasing the underground fracturing effect caused by the detonation of an underground nuclear device which comprises:
 (a) establishing an underground placement cavity for said nuclear device at the bottom of a borehole and within a selected underground formation;
 (b) drilling a plurality of support wells spaced horizontally in a pattern about said borehole;
 (c) fracturing said formation surrounding each of said support wells, said fractures extending at least into the formation adjacent said borehole to the horizontal bondary of the spherical cavity calculated for said nuclear device;
 (d) placing a nuclear device in said placement cavity;
 (e) plugging said borehole and said support wells; and
 (f) after steps (c), (d) and (e) detonating said nuclear device.

4. A method as defined in claim 3 in which said fractures are generated by hydraulic fracturing technique in which propping agents are deposited within the resulting fractures.

5. A method as defined in claim 3 which includes drilling said support wells in a circle surrounding said borehole.

6. A method as defined in claim 3 which includes drilling said support wells in a substantially straight line.

7. A method of increasing the size of a chimney formed by detonating an underground nuclear device in a formation which comprises:
 (a) drilling a well from the surface to said formation, said well being of a sufficient diameter to permit the ready passage of said nuclear device;
 (b) creating a plurality of horizontal fractures extending outwardly from said well bore, the lower of said fractures being a distance $H_2$ above the proposed depth at which the nuclear device is to be detonated, where $H_2$ is the height of a chimney formed in the absence of creating fractures prior to detonation of the nuclear device, said horizontal fractures being spaced sufficiently close so that shock waves from the subsequent detonation of the nuclear device will cause the vertically unsupported segments of rock to fail;
 (c) placing the nuclear device at its desired depth;
 (d) plugging the well bore above the upper of said fractures; and
 (e) thereafter detonating said nuclear device.

8. A method of increasing the underground fracturing effect caused by the detonation of an underground nuclear device which comprises:
 (a) establishing an underground placement cavity for said nuclear device at the bottom of a borehole and within a selected underground formation;
 (b) drilling at least one support well spaced horizontally from said borehole;
 (c) fracturing said formation surrounding said support well, said fractures extending at least into the formation adjacent said bore hole to the horizontal boundary of the spherical cavity calculated for said nuclear device;
 (d) placing a nuclear device in said placement cavity;
 (e) plugging said borehole and said support well; and
 (f) after steps (c), (d) and (e) detonating said nuclear device.

9. A method of increasing the size of a chimney formed by the detonation of a selected underground nuclear device which comprises:
 (a) establishing an underground placement cavity for said nuclear device including a bore hole drilled from the surface to the position of said placement cavity;
 (b) creating a plurality of spaced horizontal fractures in the formation surrounding said bore hole between the position of said device and the desired top of the chimney to be formed by detonating said nuclear device, the diameter of the horizontal fracture being greater than the expected diameter of the cavity formed by said detonation, and
 (c) thereafter placing a nuclear device in said placement cavity, plugging said bore hole, and detonating said nuclear device.

10. A method of increasing the efficiency of underground fracturing by the detonation of an underground nuclear device which comprises:
 (a) establishing at least two horizontally spaced vertical boreholes for the placement of said nuclear devices;
 (b) establishing underground communication between said boreholes by hydraulically fracturing in a substantially vertical plane through the boreholes;
 (c) after steps (a) and (b) simultaneously detonating a nuclear device in each of said vertical boreholes.

11. A method of increasing the efficiency of underground fracturing by the detonation of at least two underground nuclear devices which comprises:
 (a) establishing at least two horizontally spaced vertical boreholes for the placement of said nuclear devices;
 (b) establishing underground communication between said boreholes by hydraulically fracturing between the boreholes in both a vertical plane and a horizontal plane;
 (c) after steps (a) and (b) simultaneously detonating the nuclear device in each of said vertical boreholes.

12. A method of increasing the efficiency of underground fracturing by the detonation of underground nuclear devices which comprises:
 (a) establishing at least two horizontally spaced vertical boreholes for the placement of said nuclear devices;
 (b) drilling at least one support well between said pair of boreholes in said formation and fracturing the formation from said support well to said boreholes prior to detonation of said nuclear device;
 (c) after steps (a) and (b) simultaneously detonating a nuclear device in each of said vertical boreholes.

References Cited

UNITED STATES PATENTS

| 2,584,605 | 2/1952 | Merriam et al. | 166—11 |
| 2,779,735 | 1/1957 | Brown et al. | 252—8.55 |
| 2,966,346 | 12/1960 | Huitt et al. | 166—42 X |
| 3,113,620 | 12/1963 | Hemminger | 166—36 |
| 3,233,670 | 2/1966 | Thompson et al. | 166—36 |
| 3,303,881 | 2/1967 | Dixon | 166—36 |

FOREIGN PATENTS 1,278,435  10/1961  France.

OTHER REFERENCES

Atkinson et al.: "Atomic Age Fracturing May Soon Open Up Stubborn Reservoirs," The Oil And Gas Journal, Dec. 2, 1963, pp. 154–156.

Nordyke et al.; "Progress in Nuclear Excavation Technology," UCRL–12248, Dec. 12, 1964, pp. 11–17.

STEPHEN J. NOVOSAD, Primary Examiner

U.S. Cl. X.R.

166—247, 308